United States Patent [19]

Farrier et al.

[11] 4,011,348

[45] Mar. 8, 1977

[54] PROCESS FOR INHIBITING BROWNING OF FRUIT

[75] Inventors: Ray W. Farrier; Roland B. Leavens, both of Hood River, Oreg.

[73] Assignee: Diamond Fruit Growers, Inc., Hood River, Oreg.

[22] Filed: Nov. 6, 1974

[21] Appl. No.: 521,206

Related U.S. Application Data

[63] Continuation-in-part of Ser. No. 256,895, May 25, 1972, abandoned.

[52] U.S. Cl. ............................ 426/268; 426/270; 426/310; 426/546; 426/615; 426/418

[51] Int. Cl.² .......................................... A23B 7/10

[58] Field of Search .......... 426/268, 269, 270, 546, 426/418, 328, 310, 615

[56] References Cited

UNITED STATES PATENTS

| | | | |
|---|---|---|---|
| 2,176,347 | 10/1939 | Jansen | 426/268 |
| 2,475,838 | 7/1949 | Johnson | 426/269 |
| 2,583,686 | 1/1952 | DeMent | 426/268 |
| 2,628,905 | 2/1953 | Antle | 426/268 |
| 2,895,836 | 7/1959 | Lazar | 426/268 |
| 3,043,699 | 7/1962 | Schmalz | 426/268 |
| 3,594,187 | 7/1971 | Liepa | 426/372 |

*Primary Examiner*—Norman Yudkoff
*Assistant Examiner*—Martin G. Mullen
*Attorney, Agent, or Firm*—Klarquist, Sparkman, Campbell, Leigh, Hall & Whinston

[57] ABSTRACT

Raw fruits and vegetables are treated with an aqueous solution having a pH between about 4 and 7.5 and containing a selected ascorbate ion concentration in order to maintain desirable color, texture, odor and flavor characteristics when the fruit and vegetables are stored at aerobic refrigeration conditions for extended periods.

9 Claims, No Drawings

PROCESS FOR INHIBITING BROWNING OF FRUIT

CROSS REFERENCE TO RELATED APPLICATION

This application is a continuation-in-part of our copending application Ser. No. 256,895, filed May 25, 1972, now abandoned, the teachings of which are incorporated herein by specific reference.

BACKGROUND OF THE INVENTION

When many fruits and vegetables are subjected to disorganization of their tissue structure, e.g. by peeling, cutting or coring, the surfaces thereby cut often suffer undesirable changes, particularly the development of a dark and unappealing color usually termed "browning". Changes such as browning are thought to be due to certain chemical changes in the plant tissue which are catalyzed by enzymes present in the tissue such as polyphenoloxidase. When the plant tissue structure is disorganized, such as by cutting operations, the natural segregation of chemically reactive compounds in the tissue from enzymes in the tissue is destroyed, allowing the enzymes to contact the reactive compounds. This results in the rapid onset of irreversible chemical changes evidenced by undesirable browning. The browning of plant tissue is usually attributed to a mechanism whereby orthodihydroxy phenolic compounds such as catechol, caffeic acid, chlorogenic acid, or gallic acid, present in the plant tissue are oxidized by enzyme catalyzed reactions into orthoquinones which then polymerize to form the dark colored substances which are visible as browning.

Browning may be prevented or retarded by treatment of the cut plant tissue using one or more of the following techniques:

1. Removal or exclusion of oxygen, either chemically or physically;
2. Alteration of the catechol structure which is subject to enzymatic oxidation;
3. Application of a chemical to the tissue to reduce the quinone structure back to the catachol structure; or
4. The deactivation or inhibition of the enzyme polyphenoloxidase.

It is known in the art to use ascorbic acid in attempting to reduce the quinone structure back to the catachol structure for a period of time sufficient to allow the natural enzymes such as polyphenoloxidase to become inactivated by natural breakdown. Unfortunately, it has been found that, if sufficient ascorbic acid is employed to perform this function and to allow the enzymes to become inactive, the resulting fruit or vegetable product is very acidic and acquires an unpleasant and unmarketable taste. Further, the natural colors in the plant tissue may be adversely affected. These deficiencies in using ascorbic acid to retard browning are particularly apparent when the treated fruit or vegetable is subsequently stored under aerobic conditions. Aerobic storage has generally been found to cause greater and more rapid deterioration than anaerobic.

One of the primary reasons why ascorbic acid has been thought to be an effective anti-browning agent, except for the undesirable acidic qualities and color loss which it imparts to the treated fruit or vegetable, is that, being an acid, the ascorbic acid tends to produce a relatively low pH condition and to render the treated vegetable tissues quite acidic. This has been thought to control browning, since the chemical activity of enzymes such as polyphenoloxidase has been found to be highest between a pH of about 5.9 – 6.3. Thus, when ascorbic acid has been employed to provide a pH below the 5.9 level, for example, the activity of the browning enzymes has been thought to be reduced thereby.

SUMMARY OF THE INVENTION

An object of the present invention is to provide a method for treating sliced fruits and vegetables in order to inhibit undesirable discoloration of the fruits and vegetables during extended periods of storage.

A further object of the present invention is to provide a method for treating fruits and vegetables in order to prevent undesirable discoloration thereof when the fruits and vegetables are stored under aerobic refrigeration conditions.

Another object of the present invention is to provide a process for preventing browning of fruits and vegetables using an aqueous, ascorbate ion-containing solution without causing the fruits and vegetables to become undesirably acidic in taste.

A still further object of the present invention is to provide a method for treating sliced fruits and vegetables to prevent browning without subjecting the treated vegetable matter to loss of natural colors, or bleeding, when treated.

The present invention resides, in part, in the discovery that browning of sliced plant materials such as prepared fruits and vegetables can be inhibited during storage of the plant materials under aerobic refrigeration conditions by contacting the plant materials with an aqueous solution containing sodium ascorbate or a mixture of sodium ascorbate and ascorbic acid buffer in order to provide an aqueous solution containing ascorbate ions in concentrations between about 3.5 percent and about 10 percent, wherein the aqueous solution is maintained at a pH level of between about 4 and about 7.5.

DETAILED DESCRIPTION OF THE INVENTION

The process of the present invention is employed to prevent discoloration of plant materials which have been cut. The treatment according to the present invention also maintains the natural flavor and odor of the plant material after relatively long storage, even when such storage is under aerobic conditions. The process of the present invention employs an aqueous solution having an optimum concentration of ascorbate ions and a pH level within a relatively restricted range. The pH level of the treating solution employed in the present process avoids the major disadvantages of the use of ascorbic acid in plant tissue treatment as practiced in prior art. By employing a relatively neutral pH in the treating solution, the harsh and unnatural acidic flavor which is imparted to treated plant materials using ascorbic acid treatment can be avoided. Further, the bleaching out of natural plant color encountered when the large amounts of ascorbic acid required to be used is also obviated.

The weakly disassociated ascorbic ion solution utilized in the present process is preferably provided by preparing an aqueous solution of sodium ascorbate or an aqueous solution of a mixture of sodium ascorbate and ascorbic acid. A suitable solution containing the desired concentration of ascorbate ion and the desired pH may be prepared in any suitable manner using sodium ascorbate and ascorbic acid. In any case, the desired aqueous solution is prepared to provide the desired pH and ascorbate ion concentration in the solution described above so as to obtain the resulting protection against discoloration of the plant tissues upon aerobic storage. Reference to ascorbate ion concentration means the total ascorbate radical concentration present in solution.

Within the operational ascorbate ion concentration and pH ranges as set forth herein, particularly good results may be achieved by controlling the relationship of the pH of the aqueous treating solution relative to the amount of ascorbate ions employed in the solution. We have found that, in general, as the pH of the aqueous treating solution to be employed is increased, the concentration of ascorbate ion in the solution which is required for good results in treating plant tissue may be decreased. For example, in treating red Delicious apples according to the process of the present invention, utilizing an aqueous solution having a pH of 5, it has been found that an ascorbate ion concentration of about 5.5 weight percent in the aqueous solution gives excellent results, and at a pH of 4, a 10 weight percent ascorbate ion concentration is useful. On the other hand, in treating the same type of apples with an aqueous solution having a pH of 7.5, it has been found that an ascorbate ion concentration in the solution of about 3.5 weight percent will give the same excellent results.

In general, the aqueous solution employed in the treating process of this invention contains an ascorbate ion concentration between about 3.5 weight percent and about 10 weight percent of the solution. Correspondingly, the pH maintained in a solution is generally between about 4 and about 7.5.

In a preferred embodiment of the present process the aqueous solution utilized in treating the plant material contains a small amount of sodium chloride. Although the presence in the treating solution of sodium chloride is not essential, and the present process is quite effective without using sodium chloride, it has been found that use of small amounts of sodium chloride in the treating solution may be desirable when treating plant materials which contain especially active polyphenoloxidase enzymes, such as Delicious apples, Newtown apples and pears. In such cases the sodium chloride may act temporarily to inhibit the active enzymes in such fruits sufficiently to prevent any immediate deterioration of the plant tissue before the ascorbate ion treating solution can become effective. Thus, in the treatment, according to the present invention, of easily discolored plant materials, an amount of sodium chloride of up to about 0.25 weight percent of the treating solution may be employed in conjunction with the ascorbate.

The aqueous solution having the required pH range and containing the required concentration of ascorbate ions is applied to the disrupted surfaces of plant tissue. The treating solution of the present invention should be applied to the plant tissue within a short time, e.g. one or two minutes, after the plant tissue has been cut or otherwise disrupted. Once discoloration, or browning, appears on the plant tissue, the undesirable discoloration is usually at least partially irreversible. As will be apparent to those skilled in the art, it is preferable that the plant tissue not be disturbed by slicing or otherwise to any greater extent that is required for the particular processing undertaken. In this way, the flavor loss and degradation in appearance which result from leaching of the plant tissue by exposure to any aqueous solution may be avoided.

Best results in the treatment process of the present invention have been found to be obtained when the treatment of the plant material is undertaken at room temperature or below. The plant material may be contacted with the aqueous solution by any known method. For example the plant material may be contacted with the aqueous solution by dipping of the plant material in a solution or by spraying or otherwise applying the aqueous solution on the surface of the plant material to be treated.

The length of time during which the plant material is contacted with the aqueous ascorbate ion solution will vary depending upon the concentration of ascorbate ion in the solution, the pH of the solution, and the particular plant material involved. In general, good results have been found when the treatment is effected by contacting the plant material with the treating solution for about thirty seconds to about one hundred and twenty seconds.

One of the primary advantages obtained by treating plant material according to the present invention, with an aqueous ascorbate ion solution within a limited pH range, is that the plant material, once treated, may be stored in aerobic storage. This is particularly advantageous, since discoloration or browning, of plant tissue is ordinarily vastly accelerated by oxygen present in the atmosphere which contacts the plant tissue.

After treatment of the plant material with the aqueous ascorbate ion solution, as described above, the plant material is withdrawn from contact with the aqueous solution and is then stored at aerobic refrigeration conditions. After treatment according to the present invention, plant material may be thus aerobically stored for relatively extended periods without deterioration in color, flavor, odor and texture. Refrigeration conditions contemplated for use in the present process are conventional and generally include a temperature between about 32° F. and about 40° F. In the present process, the plant materials which have been treated according with the aqueous solution of ascorbate ions are preferably chilled close to but not below the temperature at which the plant material will actually freeze.

The following examples illustrate particularly preferred embodiments of the present invention, using difficultly treated fruits such as Delicious apples, Newtown apples and pears.

EXAMPLE I

After storage for three months, red Delicious apples were peeled, cored and sliced. An aqueous solution having a 3.53 weight percent ascorbate ion concentration and having a pH of 7.5 was prepared in a conventional manner using sodium ascorbate. To the solution as prepared was added 0.25 weight percent sodium chloride and 0.08 weight percent potassium sorbate to minimize spoilage of the treated fruit during subsequent storage. The sliced apples were then contacted with the ascorbate ion solution for a period of sixty seconds at a temperature of 55° F. The apple slices were removed from the solution and observed. They were found to be normal and natural in color, texture, odor, etc. The apple slices were then packaged in a high density polyethylene tray, to which was heat sealed an oxygen permeable film to permit aerobic storage. The resulting package was stored under aerobic refrigeration conditions at 35° F. The sliced apples contained in the package were observed after one day of storage and again after one week of storage. On both occasions the sliced apples in the package were found to be natural, in appearance and in flavor.

EXAMPLE II

Stored whole red Delicious apples were peeled, cored and sliced. An aqueous solution having a 5.5 weight percent ascorbate ion concentration and having a pH of 5 was prepared in a conventional manner using a mixture of sodium ascorbate and ascorbic acid. Sodium chloride was also added to the solution in an amount of 0.25 weight percent. The prepared apple slices were contacted with the above described solution for a period of sixty seconds at a temperature of 55° F. The apple slices were observed after being in contact with the solution and were found to have maintained their natural color. The apple slices were thereafter withdrawn from contact with the aqueous solution and packaged in a manner identical to that described in Example I. After having been packaged and stored at aerobic refrigeration conditions for one day, the apple slices were again observed and were found to have retained their natural flavor and texture. Likewise, after a period of storage of a total of two weeks, the apple slices in the package were once again observed and were found to have retained their natural flavor and texture.

EXAMPLE III

Fresh D'Anjou pears, known in the art to be extremely difficult to store after slicing, were taken from storage after five months and ripened. An aqueous solution having an 8.3 weight percent ascorbate ion concentration and having a pH of 7.5 was made up in a conventional manner using sodium ascorbate. The pears were cored and sliced and the slices were contacted with the aqueous ascorbate ion solution for a period of sixty seconds at a temperature of 55° F. The pear slices were then removed from the aqueous solution. The pear slices were observed and it was found that their tissue was natural in color. The pear slices were then packaged in a high density polyethylene tray to which was heat sealed an oxygen permeable film in the same manner as employed in Examples I and II. The packaged pear slices were placed in aerobic refrigeration storage at a temperature of 36° F. The pear slices in the package were observed after one day's storage and were found to be natural in appearance. The pear slices were observed again after two day's of storage and it was found that the slices exhibited some signs of deterioration, including a softening in texture and darkening of cut skin, as well as slight browning on the cut surfaces near the skin of the pears. Since pears are known to be very difficult to store under aerobic refrigeration conditions, storage at aerobic refrigeration conditions for more than one day after employing the treatment according to the present invention was felt to be a successful test of the treating solution.

EXAMPLE IV

Fresh Newtown Pippin apples, known to be more difficult to store successfully after slicing than Delicious apples, were taken from storage after five months and were peeled, cored and sliced. An aqueous solution having a 5.3 weight percent ascorbate ion concentration and having a pH of 7.5 was made up in a conventional manner using sodium ascorbate. Sodium chloride was added to the solution in an amount of 0.25 weight percent. The prepared apple slices were contacted with the solution for a period of sixty seconds at a temperature of 55° F. The slices were then removed from contact with the aqueous solution and observed. It was found that their tissue was natural in color. The slices were then packaged in a high density polyethylene tray to which was heat sealed an oxygen permeable film in the manner described in the previous examples. The resulting package was placed in aerobic refrigeration storage at a temperature of 36° F. After one day of storage, the packaged apples were observed and found to be natural in appearance and flavor. The stored apples were observed again after one week of storage and were again found to be natural in appearance and in flavor.

EXAMPLE V

Fresh Golden Delicious apples were taken from storage after five months, peeled, cored and sliced. An aqueous solution having a 5.0 weight percent ascorbate ion concentration was prepared in a conventional manner using sodium ascorbate and ascorbic acid. The resulting solution had a pH of 5.0. Sodium chloride was also added to the solution in an amount of 0.25 weight percent. The resulting solution was contacted with the prepared and sliced apples for a period of 60 seconds at a temperature of 55° F. The apple slices were then removed from contact with the solution and observed. It was found that their tissue was natural in color. The apple slices were then packaged in a high density polyethylene tray to which was heat sealed an oxygen permeable film in the manner discussed in the previous examples. The resulting package was placed in aerobic refrigeration storage at a temperature of 36° F. The packaged apples were observed after one day of storage and were found to be natural in appearance and in flavor. The packaged apples were observed again after one week and were again found to be natural in appearance and in flavor.

EXAMPLE VI

Red Delicious apples were peeled, cored and sliced. An aqueous solution having a 10 weight percent ascorbate ion concentration and a pH of 4 was prepared in a conventional manner from sodium ascorbate and ascorbic acid. Soldium chloride was added to provide a concentration of 0.25 weight percent and 0.08 weight percent sodium sorbate was added to the solution to minimize spoilage. The resulting solution was contacted with the prepared and sliced apples for a period of sixty seconds at a temperature of 55° F. The apple slices were then removed from contact with the solution and observed. It was found that their tissue was natural in color. The apple slices were then packaged in a high density polyethylene tray to which was heat sealed an oxygen permeable film in the manner discussed in the previous examples. The resulting package was placed in aerobic refrigeration storage at a temperature of 36° F. The packaged apples were observed after one day of storage and were found to be natural in appearance and in flavor. The packaged apples were observed again after one week and were again found to be natural in appearance and in flavor.

EXAMPLE VII

Fresh peaches were peeled, pitted and sliced. An aqueous solution containing 4.6 weight percent ascorbate ion and 0.26 weight percent sodium chloride and 0.12 weight percent potassium sorbate and having a pH of about 5.3 was made up in a conventional manner. The solution was contacted with a first portion of the prepared peach slices for 60 seconds at a temperature of 55° F. The treated peach slices were then removed from contact with the solution and observed. Their tissue was found to be natural in color. The treated peach slices were then packaged in a high density polyethylene tray to which was heat sealed an oxygen permeable membrane in the same manner used in the foregoing examples. The resulting package was placed in aerobic refrigeration storage at a temperature of about 37° F. Another portion of the same peeled, pitted and sliced peaches was packaged and stored in exactly the same manner as the treated slices, but without treatment with ascorbate ion according to the present invention, for purposes of comparison. Both the treated, packaged peach slices and the untreated packaged peach slices were observed after twelve days of storage. The untreated peach slices were found to have a brown coloration and to have a stale taste. The treated peach slices, on the other hand, were found to be natural in both appearance and taste when observed.

EXAMPLE VIII

Fresh raw carrots were sliced. An aqueous solution containing 5.3 weight percent ascorbate ion and having a pH of about 7.5 was prepared in a conventional manner. The sliced carrots were contacted with the ascorbate ion solution for sixty seconds at a temperature of 55° F. The sliced carrots were then recovered and observed. They were found to be natural in appearance. The treated sliced carrots were then packaged in a high density polyethylene tray to which was heat sealed an oxygen permeable membrane in the same manner used in the foregoing examples. The resulting package was placed in aerobic refrigeration storage at a temperature of about 37° F. The packaged carrot slices were observed after one day of storage and again after two days of storage and were found to be natural in appearance on both occasions.

It will be apparent from the foregoing description of the preferred embodiment and examples that many variations and modifications in the details of the process of this invention will be possible within its broad scope.

We claim:
1. A process for preservation of plant material subject to browning which comprises;
    applying to the surface of said plant material an aqueous solution having a pH of between 4 and 7.5 and consisting essentially of a material selected from the class consisting of sodium ascorbate and a mixture of sodium ascorbate and ascorbic acid so as to provide ascorbate ion in a concentration of from about 3.5 to about 10 weight percent of the solution,
    removing said plant material from said solution and storing said plant material under aerobic conditions at a temperature between about 32° F. and 40° F.
2. The process of claim 1 wherein said plant material is apples.
3. The process of claim 1 wherein said solution is prepared from sodium ascorbate, ascorbic acid and water.
4. The process of claim 2 wherein said solution contains 5.5 weight percent ascorbate ion concentration and a pH of 5.
5. The process of claim 2 wherein said solution has a 3.5 weight percent ascorbate ion concentration and has a pH of 7.5.
6. The process of claim 1 wherein said plant material is contacted with said solution for a period of time of from about one-half minute to about two minutes.
7. The process of claim 1 wherein said solution contains about 0.25 weight percent sodium chloride.
8. The process of claim 1 wherein said plant material is peaches.
9. The process of claim 1 wherein said plant material is carrots.

* * * * *